United States Patent
Prashanth

(10) Patent No.: US 8,495,630 B2
(45) Date of Patent: Jul. 23, 2013

(54) TRANSFERRING OBJECTS BETWEEN VIRTUAL MACHINES

(75) Inventor: Krishna Prashanth, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 12/938,595

(22) Filed: Nov. 3, 2010

(65) Prior Publication Data

US 2012/0110573 A1     May 3, 2012

(51) Int. Cl.
   *G06F 9/455*        (2006.01)
   *G06F 15/16*       (2006.01)
   *G06F 15/173*      (2006.01)

(52) U.S. Cl.
   USPC ............... 718/1; 709/204; 709/208; 709/217; 709/218; 709/219; 709/238; 709/246

(58) Field of Classification Search
None
See application file for complete search history.

(56) References Cited

U.S. PATENT DOCUMENTS

| | | | |
|---|---|---|---|
| 6,694,346 B1 * | 2/2004 | Aman et al. ................... | 718/104 |
| 6,738,977 B1 * | 5/2004 | Berry et al. .................... | 719/332 |
| 6,971,097 B1 * | 11/2005 | Wallman ....................... | 718/101 |
| 7,426,721 B1 | 9/2008 | Saulpaugh et al. | |
| 7,665,077 B2 * | 2/2010 | Mariani et al. ................. | 717/148 |
| 2002/0046304 A1 | 4/2002 | Fabri et al. | |
| 2003/0033344 A1 * | 2/2003 | Abbott et al. ....................... | 709/1 |
| 2003/0208743 A1 * | 11/2003 | Chong et al. ................... | 717/106 |
| 2004/0109470 A1 | 6/2004 | Derechin et al. | |
| 2005/0160413 A1 * | 7/2005 | Broussard et al. ............ | 717/148 |
| 2005/0160424 A1 * | 7/2005 | Broussard et al. ................. | 718/1 |
| 2005/0262512 A1 * | 11/2005 | Schmidt et al. ............... | 719/310 |
| 2006/0070051 A1 * | 3/2006 | Kuck et al. .................... | 717/162 |
| 2007/0168509 A1 | 7/2007 | Droshev et al. | |
| 2008/0066081 A1 * | 3/2008 | Monnie et al. ................. | 719/315 |
| 2008/0222198 A1 * | 9/2008 | Wilkinson ................ | 707/103 R |
| 2009/0172664 A1 * | 7/2009 | Mostafa ............................ | 718/1 |
| 2009/0193414 A1 * | 7/2009 | Broussard et al. ................. | 718/1 |
| 2009/0271588 A1 * | 10/2009 | Barsness et al. .............. | 711/170 |
| 2009/0271807 A1 * | 10/2009 | Barsness et al. .............. | 719/330 |
| 2011/0078659 A1 * | 3/2011 | Stark et al. .................... | 717/122 |

* cited by examiner

*Primary Examiner* — Emerson Puente
*Assistant Examiner* — Adam Lee
(74) *Attorney, Agent, or Firm* — Thomas E. Lees, LLC

(57) ABSTRACT

Object calls for objects not available on a local virtual machine are fulfilled by requesting the object itself from a remote virtual machine and reconstructing a local instance of the requested object on the local virtual machine. The local instance is reconstructed using information about the class, variables, and methods associated with the remote instance of the object communicated to the local virtual machine. Present and future calls to the object are then directed to the local instance of the requested object.

14 Claims, 5 Drawing Sheets

TRANSFERRING OBJECTS BETWEEN VIRTUAL MACHINES

BACKGROUND

Various aspects of the present invention relate generally to virtual machines, and more particularly, to the efficient transfer of objects between virtual machines.

A virtual machine is a software representation of a physical machine that provides resources and abstractions to software running within the virtual machine. A virtual machine may be implemented as a "system" virtual machine, which can be used to create a virtual environment in which an operating system, programs and/other software can execute as if the software were being executed on a conventional physical machine. A virtual machine may also be implemented as a "process" virtual machine, which can be used to create a virtual environment that supports a single application or process.

A virtual machine is software, and must therefore run on a physical machine. However, a single physical machine may host multiple virtual machines. When a virtual machine is started, the underlying physical machine allocates memory resources, called a heap to the virtual machine. As such, each virtual machine has a unique, reserved memory space within the memory of the host physical machine. Examples of virtual machines include, but are not limited to, Java virtual machine, Parrot, CPython, and the Perl virtual machine.

Object-oriented programming is a programming paradigm that facilitates application development utilizing data structures to represent bundled state and behavior information as objects. In object-oriented programming, classes are used to define the types of objects available to an application. Basically, a class is a template on which objects are based. An object is created (instantiated) from a class, and thus represents a specific instance of the class from which the object is instantiated. Each object stores variables, sometimes called fields or attributes, which are used to represent the state of the object. Each object also stores methods, sometimes called functions, which are used to represent the behavior of the object. In the context of object oriented processing using virtual machines, the classes and/or objects necessary to an application executing in a virtual machine are stored in the virtual machine's heap.

BRIEF SUMMARY

According to aspects of the present invention, an object call is fulfilled by identifying a reference to an object made by an application, where the referenced object is not located on a local virtual machine hosting the application. Further, the object call is fulfilled by identifying a remote virtual machine having an instance of the referenced object and by requesting object information from the identified remote virtual machine. Still further, the object call is fulfilled by creating a local instance of the requested object by reconstructing the object on the local virtual machine based at least in part on information about the runtime state of the object on the remote virtual machine and by delegating future object calls referencing the object by the application, to the local instance of the object.

DETAILED DESCRIPTION

Various aspects of the present invention relate to the transfer of objects between virtual machines. In object-oriented programming, an object comprises variables, which identify the state of the object, and methods, which identify the behavior of the object. Together, the object's variables and methods define the runtime state of the object. Depending upon the specific needs of an application, objects can range from relatively simple to extremely complex. For example, in the context of Java-based applications, Plain Old Java Objects (POJO) are simple Java objects which usually do not have many levels of cross reference to other objects. Thus, a POJO is generally considered a light weight object. Comparatively, Enterprise Java beans are typically considered heavy weight objects.

Memory resources are allocated to a virtual machine in a structure called a heap. A heap is typically, a contiguous block of physical memory that is reserved for use by an associated virtual machine. Thus, the heap is intrinsically tied to a resource on a physical machine that is running the virtual machine. One of the aspects of the present invention is to enable communication between the heaps of multiple virtual machines, i.e., inter-heap communication.

Inter-heap communication allows for the transfer of information such as objects from the heap of one virtual machine to the heap of another virtual machine. Thus, for example, inter-heap communication can be used to transfer objects, including the runtime state of the transferred object, thus facilitating the ability to rapidly share and reuse code. According to aspects of the present invention, inter-heap communication between Java Virtual Machines enables a local Java Virtual Machine to reconstruct an object, such as a POJO, obtained from a remote virtual Java Virtual Machine, locally in the heap of the local Java Virtual Machine.

Figure 1:
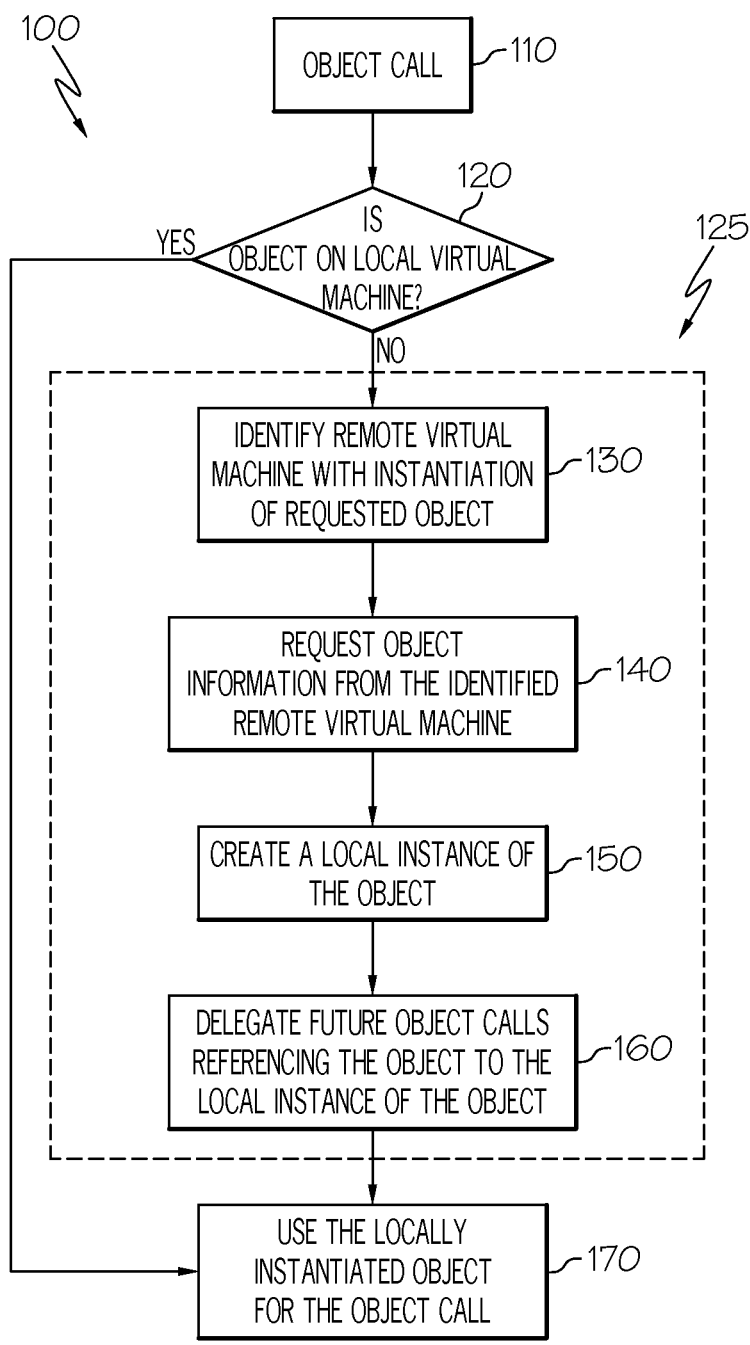
FIG. 1 is a flow chart illustrating an overall flow of a method for fulfilling an object call made by an application running on a virtual machine.

Referring now to the drawings, and in particular, to FIG. 1, a method 100 for fulfilling an object call is illustrated according to various aspects of the present invention. The method 100 may be embodied, for example, as a computer program product comprising a computer readable storage medium having computer readable program code embodied there on. When the computer readable program code is executed by a processor, the program code implements the method 100. Moreover, the method may be implemented by a processor of a computing device executing instructions stored in memory. The method may alternatively be distributed across multiple processors capable of communication with one another.

The method 100 is useful, for example, for obtaining an object by an application associated with a first virtual machine, by reconstructing an existing object from a second virtual machine.

The method 100 is implemented by identifying a reference to an object made by an application, where the referenced object is not located on a local virtual machine hosting the application. For instance, an application, running on a first virtual machine, referred to herein as a local virtual machine, makes a call for an object at 110. Accordingly, a determination is made at 120, e.g., by the runtime, if the object is available (locally present) on the local machine. If the object is available, then the application uses that object to fulfill the object call, e.g., at 170. If the requested object is not available, i.e., if the requested object is not locally present or located on a local virtual machine hosting the application, a process 125 is implemented for fulfilling the object call for the requested object.

Further, the object call is fulfilled by identifying a remote virtual machine at 130 that has an instance of the requested object. This identification process at 130 is described in greater detail in reference to FIG. 2, below. Moreover, the object call is fulfilled by requesting object information associated with the object, from the identified remote virtual machine. In response to the request, the remote virtual machine returns, for example, a serialized object with the state of the object from the remote virtual machine intact. In this example, the class definition of the object, along with instance information (runtime status), which includes variables and methods associated with the object, are returned to the caller such that the serialized object can be reverted back to a copy of the requested object.

Still further, the object call is fulfilled by creating a local instance of the object at 150 by reconstructing the object on the local virtual machine based at least in part on information about the runtime state of the object on the remote virtual machine. Keeping with the above-example, using the information received from the remote virtual machine, e.g., a serialized version of the requested object, the local virtual machine reconstructs the requested object. In practice, creating a local instance of the object may be implemented using a mechanism built into the local virtual machine. However, at the physical level, the creation of a local instance of the object may be implemented by a processor of a corresponding host physical computer device, which allocates the object to the physical memory heap associated with the local virtual machine.

Still further, the object call is fulfilled by delegating current and future calls referencing the object by the application, to the local instance of the object at 160. Thus, current calls and future calls for the object by the application, can use the locally stored version of the object at 170.

According to aspects of the present invention, a local virtual machine can use an object located in another, different virtual machine as-is. In this regard, the desired object in the remote virtual machine can be obtained without having to import class libraries into the local virtual machine or place the library references in the local virtual machine. Thus, by way of illustration, and not by way of limitation, a class that implements a data access mechanism running on a remote virtual machine can be obtained and reconstructed into a local virtual machine so that an instance of the data access mechanism is also running in the local virtual machine. Moreover, the process of obtaining the object, e.g., the data access mechanism, is achieved without exposing the object as a service over a high level protocol.

Figure 2:
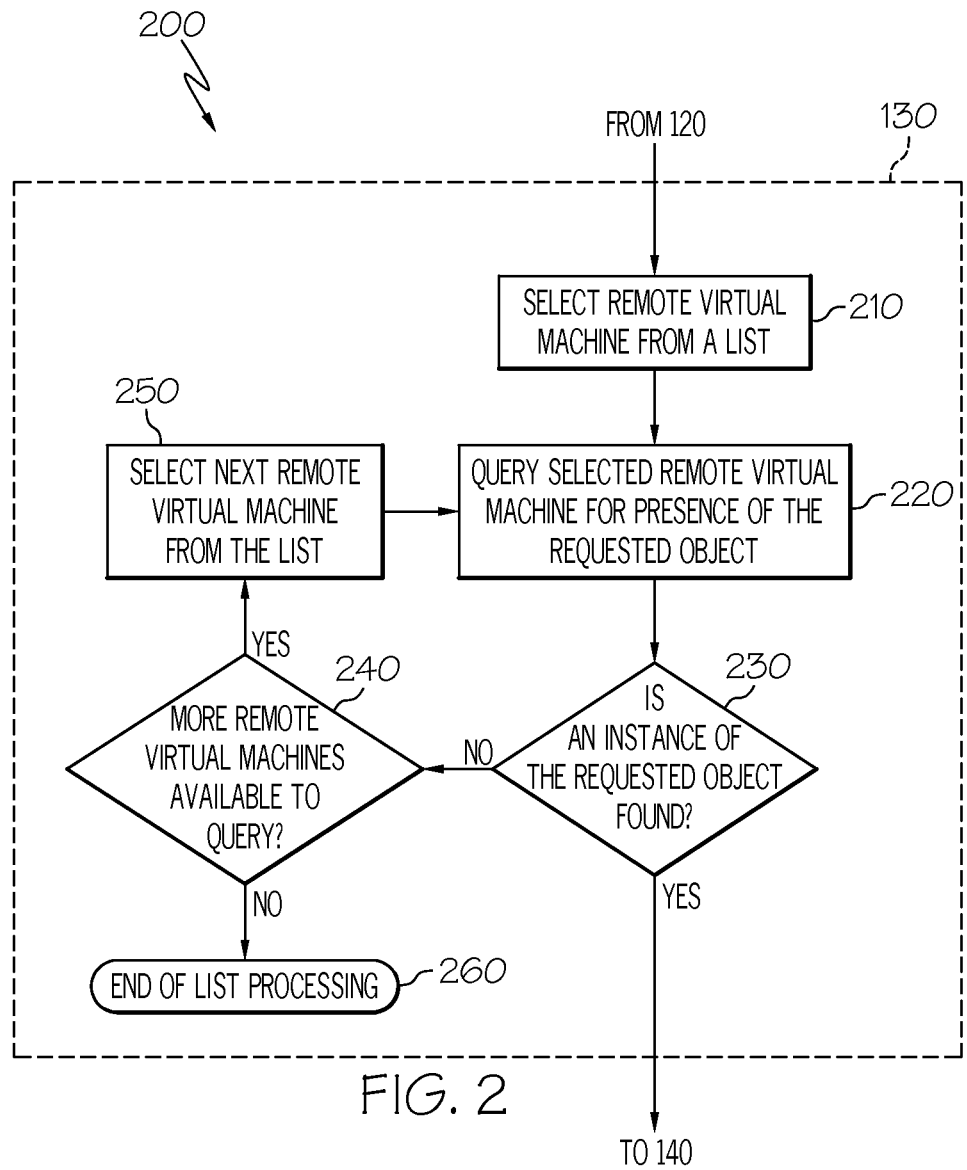
FIG. 2 is a flow chart further illustrating identifying a remote virtual machine from the method of FIG. 1.

Referring to FIG. 2, a flow chart illustrates an exemplary method 200 for implementing the identification process 130 of the method 100 of FIG. 1. A list of names corresponding to remote virtual machines is supplied, identified, or otherwise derived, e.g., by an associated programmer, process or via other technique. The process comprises choosing a name from the list and selecting the remote virtual machine associated with the chosen name at 210. The process then queries the selected remote virtual machine at 220 for the presence of the requested object. If the selected remote virtual machine responds at 230 that the requested object is present, then the method 200 ends. For instance, flow may return to requesting the object at 140 in the example of FIG. 1. However, if it is determined that the object is not available, e.g., if the selected remote virtual machine responds that the object is not available, then the method 200 determines at 240 if there are more names of remote virtual machines on the list that have not yet been selected.

If the list still includes unselected names and the requested object has not been located, then the process selects a previously unselected name and selects the remote virtual machine associated with that name at 250. In a manner analogous to that described above, the process flow loops back to 220 which queries the selected remote virtual machine for the presence of an instance of the object. This process repeats until the requested object is found or all the names of virtual machines on the list have been selected.

If all of the names on the list have been selected and the requested object is not located, then end of list processing is optionally performed at 260. The process at 260 may report or otherwise throw an error. For instance, in certain implementations, it may be satisfactory to throw an error back to the user stating that the class definition could not be found. Still further an alternative process at 260 may include for example, but is not limited to, reporting an error; finding a shared class from a remote virtual machine not on the list and instantiating a new object; finding an object available on a remote virtual machine not on the list and exposing that object as a service using a high-level protocol; and any combination thereof.

The name from the list may be chosen in several ways. In an illustrative example, the first name on the list is chosen. If the selected virtual machine cannot provide the requested object, the method works down the list until the object is provided or not found. The method 200 may choose a name alphabetically and work through the list that way. Other techniques may alternatively be selected for ordering the list of virtual machines.

Figure 3:
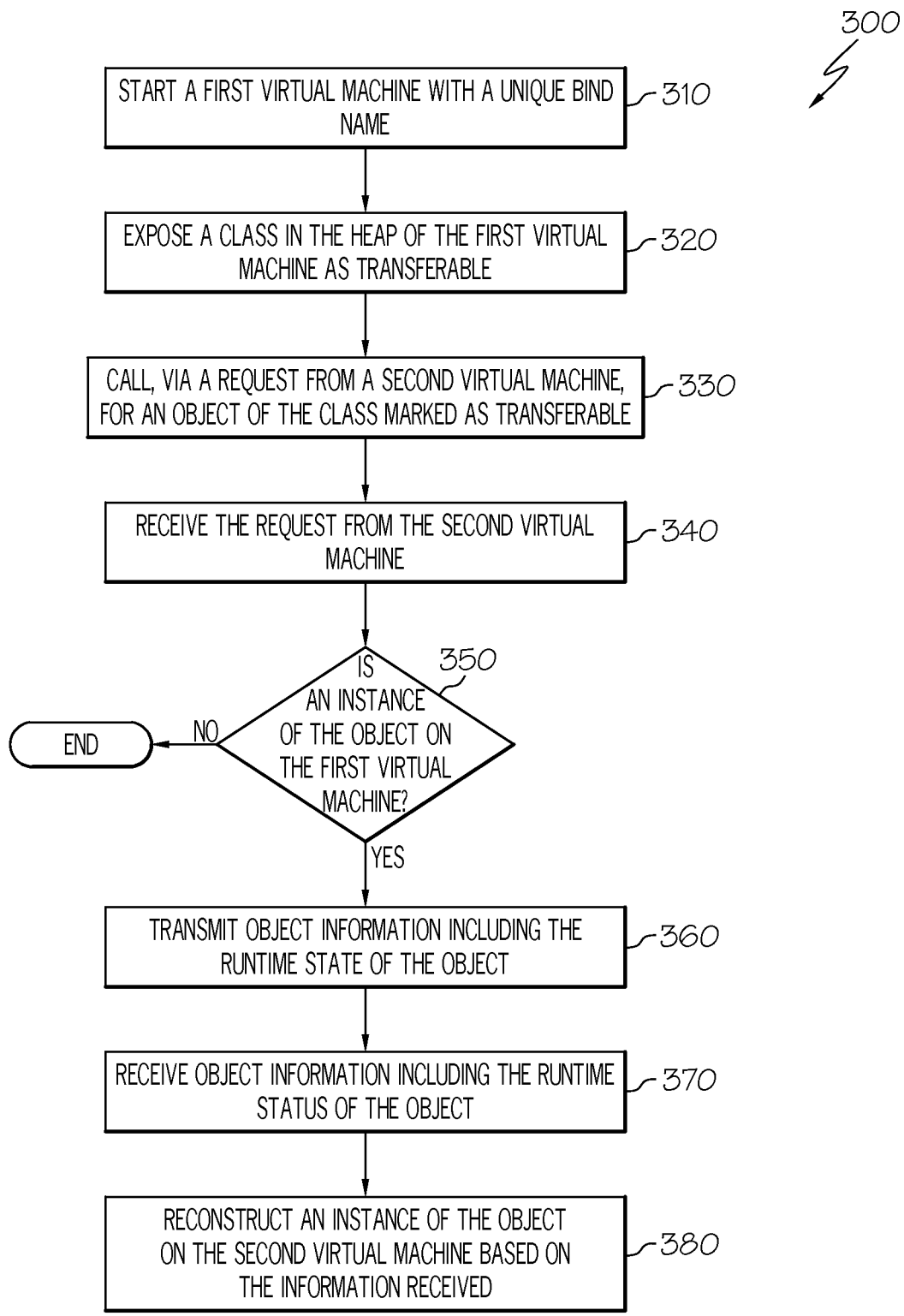
FIG. 3 is a flow chart illustrating how to implement inter-heap communication between virtual machines.

FIG. 3 illustrates an exemplary method 300 for implementing inter-heap communication between virtual machines in a Java environment. To enable inter-heap communication in the illustrative implementation, a mechanism may be built into a compiler. For example, if the code is Java, then a communication mechanism is built into the Java compiler and the corresponding remote virtual machines. Code for enabling inter-heap communication between virtual machines may be implemented, for example, by an API (application programming interface) exposing heap objects. The heaps of several virtual machines may coexist in a single physical memory, or the heaps may be distributed across different physical memories, e.g., across different physical computing devices.

The method 300 comprises starting a first virtual machine at 310 with a unique bind name against which the objects are bound:

java-bindName JVM1-class com.ibm.Test

In the above example, the class Test is bound to a virtual machine named JVM1.

Further, the command may include a permission grant to the virtual machine that is allowed to make a call, i.e., the local virtual machine:

java-bindName    JVM1-class    com.ibm.Test-D allowedVM=JVM2

Security features may be further extended as required by a particular implementation. For instance, fine grained security, such as encryption and user-permissions, can be added to the procedure. In the above example, a second virtual machine named JMV2 is granted permission to interact, e.g., for inter-heap communication, with a first virtual machine, JMV1.

The classes which need to be transferable are marked using a marker interface to enable the transfers. The method 300 thus further comprises exposing a class in the heap of the first virtual machine as transferable at 320. For example, the class may be marked as "Shareable":

class Test implements Serializable, Shareable

The serialization algorithm is used to send information between virtual machines. The class Test is now "Shareable," i.e., transferable.

The heap registry may be implemented as a service in the virtual machine that hands out objects to an application calling for the object, e.g., virtual machine JVM1 in the above example, and can be run on any port. Objects are registered in the heap registry using a bind name. A second virtual machine calls for an object of the class marked for transfer at 330. For instance, the second virtual machine could comprise the local virtual machine associated with the process 130 described with reference to FIG. 1.

--- java -bindName JVM2 -lookupLocation <IP Address1:port1>, <IP Address2:port2> -class "com.ibm.Test" -lookupName JVM1

---

The method 300 thus enables the second virtual machine to look up objects of class Test on the first virtual machine. If the bind name is not unique, then the port number may be added as an extension to create a unique bind name.

The first virtual machine receives the request for the object at 340 and determines at 350 if an instance of the object is present on the first virtual machine. If an instance is present, then the first virtual machine transmits the object information including the runtime state of the object at 360. The second virtual machine receives the information at 370 and reconstructs an instance of the object on the first virtual machine at 380. If a determination is made at 350 that an instance of the object is not present on the virtual machine, the process may end.

An illustrative example of pseudo-code, provided below, may be useful, for example, when writing code to compile the sources, e.g., in a Java application. The code can be written such that when the source is referring to a class which is non-existent in the classpath, the class definition can also be obtained from a different virtual machine by enabling flags during compilation.

---

MyProgram.java

Class MyProgram
{
    void method1( )
    {
        com.ibm.Test instance=new com.ibm.Test( );
    }
}
e.g., javac MyProgram.java -classpath <> -classList <"com.ibm.Test">
-lookupLocation <IP Address1:port1>, <IP Address2:port2> -VMNames JVM2, JVM3

---

The definition of the class is borrowed from JVM2 or JVM3. In this implementation, the method 300 will select JVM2 first, then it will select JVM3 if the object is not found on JVM2, assuming for example, that JMV2 and JMV3 are running In this regard, it is still possible to get a compilation error, e.g., where the class definition cannot be obtained from any of the listed virtual machines.

In general, optimizations can be built into the compiler to generate class files in a manner that suits the transportation of that object to a different runtime. For instance, in the context of a Java implementation, the byte code generation may automatically be used when a marker interface "Shareable" is encountered, as described above. Further modifications to the serialization algorithm may also be implemented. As such, when a runtime requests an object in a different runtime, a relatively small amount of work is required to recreate the object hierarchy in the new runtime. The Java runtime can be enabled to automatically get objects ready to be transportable when a virtual machine implements the Sharable interface or specific classes can be made shareable by specifying the specific classes as command line arguments. Since object construction happens within the runtime, security implications, major/minor version matches, etc., are taken care of In case an object cannot be reconstructed, a runtime exception such as NonTransportableException can be thrown. If an issue is found during the compilation phase itself, the issue may be flagged as a compilation error.

Whenever an object cannot be found in a virtual machine, a communication happens to the listed heap registries in the order listed, e.g., at designated ports, against the bind name. If a registration is found, then the located object is serialized, marshaled and reconstructed in the caller's virtual machine. This is a one time effort, and may be equivalent, for example, to an RMI call. Subsequent object references are isolated to the caller's virtual machine.

The communication protocol between virtual machines includes, but is not limited to, RMI (remote method invocation), proprietary protocols, or a combination thereof. However, the protocol used should not be an application-layer protocol, because an application-layer protocol adds unnecessary parsing of the data along the layers. The heap registry API could also be private so that only the virtual machines' internal processes alone can use the API. Still further, certain methods could be exposed to programmers, who can write code to register their classes with the heap registry.

The heap API exposes certain methods including finder services, transport services, and object handling. For instance, the heap API may expose methods to implement finder services such as locating class definitions based on bind names and locating a running object instance. The heap API may expose methods to implement transport services such as transporting a class definition and transporting an object instance.

The heap API may also expose methods to implement object handling services, such as creating a new object locally, fetching an object instance, and introspecting a running object instance. By way of illustration, an example usage of creating a new object locally comprises:

ObjectFactory.newInstance(true).

An example usage of fetching an object instance comprises:

ObjectFactory.newInstance(false, <ObjID>).

The introspect service allows a user to find a specific instance of an object if more than one are present on the remote machine. For example:

ObjectIntrospector.getMethods(clsname, objectMetaData)

The above approach may be used to get a running instance of an object, e.g., by filtering out a desired instance from many running instances of the desired object. By matching the MetaData argument to a value of an object's variable or method, the introspector may be used to identify a specific running instance of the object.

Figure 4:
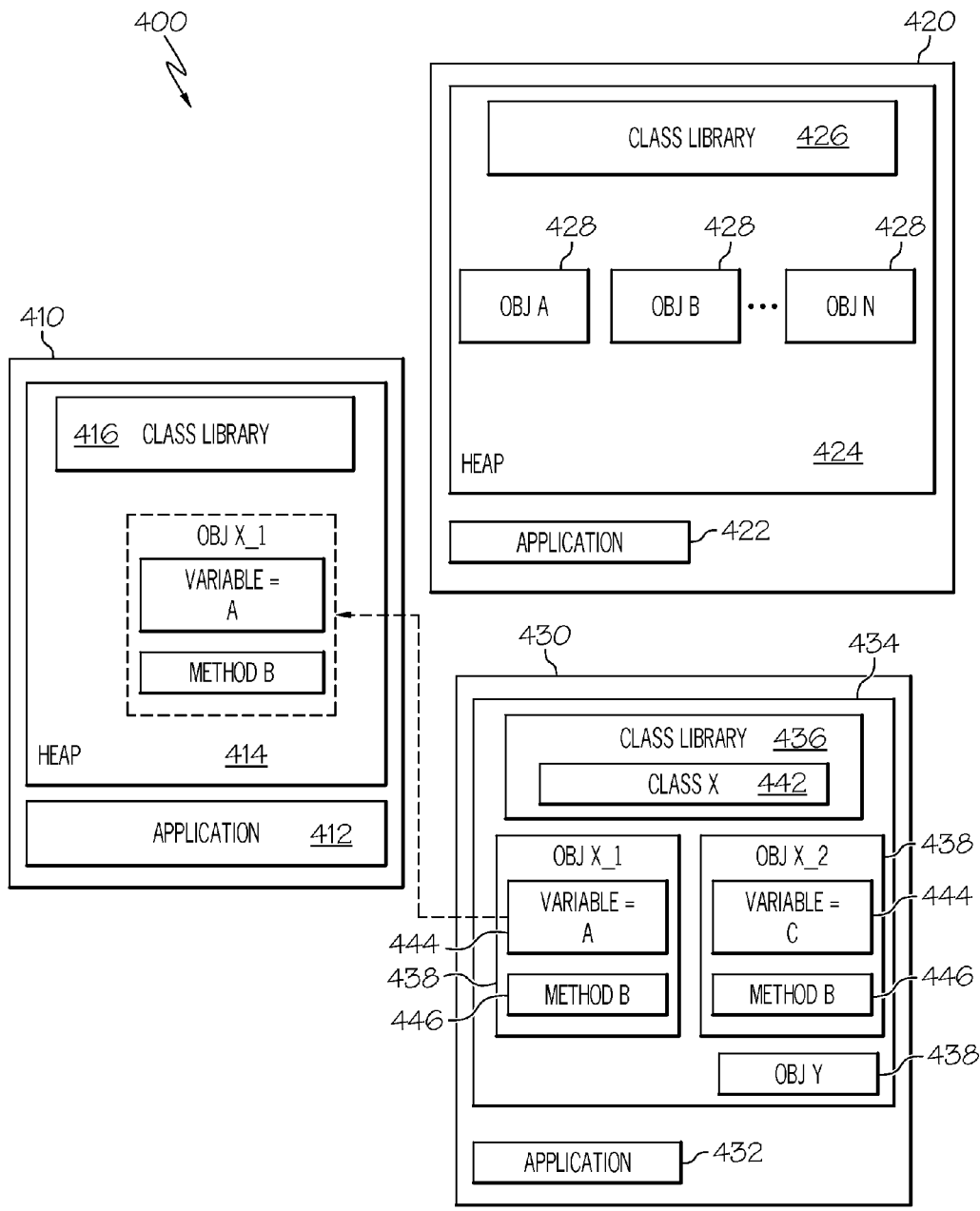
FIG. 4 is a block diagram illustrating a system suitable for implementing the methods of FIGS. 1-3.

Referring now to FIG. 4, an example system 400 is illustrated for implementing aspects disclosed herein. The exemplary system 400 includes a local virtual machine (LVM) 410. The LVM 410 is running an application 412 and has a heap 414, which includes a class library 416.

The system also includes a first remote virtual machine (RVM) 420. The first remote virtual machine (RVM1) 420 includes an application 422, and a heap 424, which includes a class library 426 and several objects 428, designated A-N.

The system still further comprises a second virtual machine 430. The second remote virtual machine (RVM2) 430 includes an application 432 and a heap 434, which includes a class library 436 and three objects 438, designated as objects X_1, X_2 and Y. The class library 436 of RVM2 430 includes a class definition 442 for class X. Two of the objects 438 in the RVM2 430 are instances class X and are thus further designated as X_1 and X_2. Object X_1 has a variable 444 having the current value of 'A' and a method 446 defined as B. Variable A and method B comprise the runtime status of object X_1. Similarly, the value of the variable 444 associated with object X_2 is designated "C". Variable C and method B comprise the runtime status of object X_2.

The local virtual machine 410 and remote virtual machines 420, 430 may be executed on the same physical machine, or the local virtual machine 410 and remote virtual machines 420, 430 may be distributed across multiple physical machines.

The local virtual machine 410 is so named because it is the virtual machine running the application 412. RVM1 420 and RVM2 430 are identified as potential sources for objects, e.g., RVM1 420 and RVM2 430 may be on a list of remote virtual machines to look for any objects not available on the LVM 410, as described in greater detail herein.

The application 412 running on the LVM 410 makes a call for an object, which is of class X. The class library 416 on the LVM 410 does not have a definition for the class X, so the LVM 410 looks for an instance of class X on the remote virtual machines 420, 430. The LVM 410 selects RVM1 420, which is the first name on the list of remote virtual machines, and makes a query to determine if an instance of class X is present on RVM1 420. While RVM1 has some objects 426 in its heap 422, none of those objects are of class X. RVM1 420 replies that it does not have an instance of class X.

The LVM 410 proceeds to the next name on the list, RVM2 430, and makes a query to determine if an instance of class X is present on RVM2 430. RVM2 430 has two objects, object X_1 and object X_2 of class X present in its heap 434. Therefore, RVM2 can respond to the request. Moreover, there are two instances of an object of class X. Therefore, a process is utilized to filter the object instances, e.g., based upon a metadata argument. In the illustrative example, object X_1 is selected to respond to the request. RVM2 430 transmits to the LVM 410, a serialized version of object X_1, as illustrated by the dashed lines.

The LVM 410 uses the class and instance information to reconstruct a local instance of object X_1. So, within the system 400, there are two identical versions of object X_1, one on RVM2 430 and one on the LVM 410. All future calls to object X_1 made by the application 412 on the LVM 410 are fulfilled by the local instance of the object, now in heap 414.

The two instances of the object are identical when the local instance is reconstructed. However, either application 412, 432 may make changes to the state of the object associated with their virtual machine 410, 430 respectively. Eventually, the two instances of the object may not be identical.

Besides the benefits mentioned above concerning performance and resource management, the present invention may also be used as a type of "Object as a Service" similar to "Software as a Service" concept. Therefore, code developed by one developer may be shared by another developer.

Various aspects of the present invention provide approaches for reconstructing an object locally, such that the class library of the local virtual machine does not need to have a full set of class definitions required for the application. Moreover, as described herein, the local virtual machine has to query outside its own heap only once. In this regard, all future calls to the object are then referenced to the locally instantiated object. Moreover, there is less overhead than when using high level protocols such as, but not limited to, SOAP (simple object access protocol), CORBA (common object request broker architecture), and REST-style (representational state transfer) communication for implementing requests.

Figure 5:
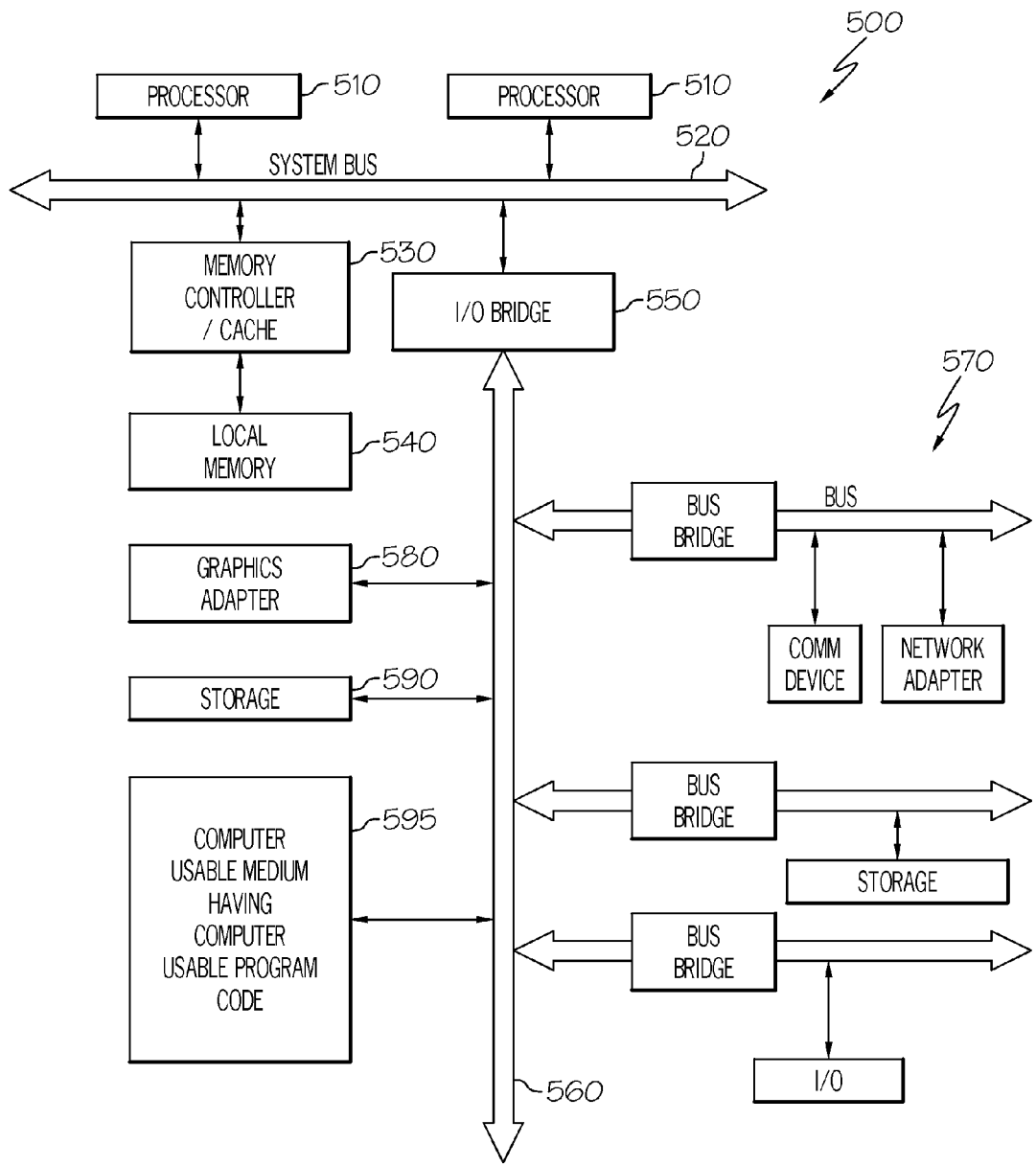
FIG. 5 is a block diagram of a computer system having a computer readable storage medium for implementing functions according to various aspects of the present invention as described in greater detail herein.

Referring to FIG. 5, a block diagram of a data processing system is depicted in accordance with the present invention. Data processing system 500 may comprise a symmetric multiprocessor (SMP) system or other configuration including a plurality of processors 510 connected to system bus 520. Alternatively, a single processor 510 may be employed. Also connected to system bus 520 is memory controller/cache 530, which provides an interface to local memory 540. An I/O bus bridge 550 is connected to the system bus 520 and provides an interface to an I/O bus 560. The I/O bus may be utilized to support one or more buses and corresponding devices 570, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 580, storage 590 and a computer usable storage medium 595 having computer usable program code embodied thereon. The computer usable program code may be executed to implement any aspect of the present invention, for example, to implement any aspect of any of the methods and/or system components illustrated in FIGS. 1-4. Moreover, the computer usable program code may be utilized to implement any other processes that are associated with transferring objects, inter-heap communication, or other aspects as set out further herein.

The data processing system depicted in FIG. 5 may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon, e.g., providing program code for use by or in connection with a computer or any instruction execution system.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for fulfilling an object call, the method comprising:
   identifying a reference to an object made by an application, where the referenced object is not located on a local virtual machine hosting the application;
   identifying a remote virtual machine having an instance of the referenced object, wherein identifying a remote virtual machine comprises:
      selecting a remote virtual machine associated with a name from a list comprising the names of at least two remote virtual machines;
      querying the selected remote virtual machine for the presence of an instance of the referenced object; and
      repeating the selecting and querying until an instance of the referenced object is found on a remote virtual machine;
   requesting a specific instance of the referenced object based at least in part on the runtime state of the referenced object from the identified remote virtual machine;
   creating a local instance of the referenced object by reconstructing the referenced object on the local virtual machine based at least in part on the runtime state of the specific instance of the referenced object on the remote virtual machine; and
   delegating future object calls referencing the referenced object by the application to the local instance of the referenced object.

2. The method of claim 1, wherein creating a local instance of the referenced object further comprises: receiving a serialized version of the referenced object from the remote virtual machine, wherein reconstructing the referenced object comprises reconstructing the referenced object based upon the serialized version of the referenced object.

3. The method of claim 1, wherein the local instance of the referenced object is further based at least in part on information comprising a class definition of the referenced object.

4. The method of claim 1, wherein identifying a reference to an object instance made by an application comprises: identifying a reference to an object instance of a Plain Old Java Object.

5. The method of claim 1, further comprising:
   determining if an instance of the requested object is present on the remote virtual machine; and
   transmitting object information comprising the runtime state of the requested object on the remote virtual machine.

6. A computer program product to fulfill object calls made by an application running on a local virtual machine comprising:
   a computer usable hardware device having computer usable program code embodied therewith, the computer usable program code comprising:
   computer usable program code configured to identify a reference to an object instance made by an application, where the referenced object instance is not located on a local virtual machine hosting the application;
   computer usable program code configured to identify a remote virtual machine having an instance of the referenced object, wherein identifying a remote virtual machine comprises:
      selecting a remote virtual machine associated with a name from a list comprising the names of at least two remote virtual machines;
      querying the selected remote virtual machine for the presence of an instance of the referenced object; and
      repeating the selecting and querying until an instance of the referenced object is found on a remote virtual machine;
   computer usable program code configured to request a specific instance of the referenced object based at least in part on the runtime state of the referenced object from the identified remote virtual machine;
   computer usable program code configured to create a local instance of the referenced object by reconstructing the referenced object on the local virtual machine based at least in part on the runtime state of the specific instance of the referenced object on the remote virtual machine; and
   computer usable program code configured to delegate future object calls referencing the referenced object to the local instance of the referenced object.

7. The computer program product of claim 6, wherein the computer usable program code configured to create a local instance of the referenced object further comprises: computer usable program code configured to receive a serialized version of the referenced object from the remote virtual machine, wherein the computer usable program code configured to reconstruct the referenced object comprises computer usable program code configured to reconstruct the referenced object based upon the serialized version of the referenced object.

8. The computer program product of claim 6, wherein the local instance of the referenced object is further based at least in part on information about a class of the referenced object.

9. The computer program product of claim 6, wherein the computer usable program code configured to accept a request to fulfill an object call comprises computer usable program code configured to accept the request only when the requested object comprises a Plain Old Java Object.

10. The computer program product of claim 6, wherein the computer usable program code further comprises:
   computer usable program code configured to determine if an instance of the requested object is present on the remote virtual machine; and
   computer usable program code configured to transmit object information comprising the runtime state of the requested object on the remote virtual machine.

11. A method of inter-heap communication comprising:
   starting a first virtual machine with a unique bind name;
   exposing a class in a heap of the first virtual machine as transferable, wherein the heap comprises a computer readable memory;
   calling, via a request from a second virtual machine, for an object of the class marked as transferable;
   receiving the request from the second virtual machine, wherein the request is a call for the object of the class marked for transfer based at least in part on a runtime state of the object;
   determining if an instance of the requested object is on the first virtual machine, wherein the determining comprises:
      selecting a remote virtual machine associated with a name from a list comprising the names of at least two remote virtual machines;

querying the selected remote virtual machine for the presence of the instance of the requested object; and repeating the selecting and querying until the instance of the requested object is found on a remote virtual machine;

transmitting object information including the runtime state of the instance of the requested object from the first virtual machine to the second virtual machine; and reconstructing an instance of the object on the second virtual machine based at least in part on the object information received from the second machine.

12. The method of claim 11, wherein starting a first virtual machine with a unique bind name comprises granting permission to the second virtual machine allowing the second virtual machine to make an object call to the first virtual machine.

13. The method of claim 11, further comprising: marking the class as Shareable and using a serialization algorithm to communicate an object instance of the shareable class to another virtual machine.

14. The method of claim 11, further comprising: implementing a service comprising a heap registry for identifying objects that are shareable with other virtual machines that look up an object in the heap registry.

* * * * *